United States Patent

[11] 3,630,708

| [72] | Inventors | Allen C. Ihrig<br>Corning;<br>Villem Rahe, Painted Post, both of N.Y. |
|---|---|---|
| [21] | Appl. No. | 12,939 |
| [22] | Filed | Feb. 20, 1970 |
| [45] | Patented | Dec. 28, 1971 |
| [73] | Assignee | Corning Glass Works<br>Corning, N.Y. |

[54] FOREHEARTH SURFACE-GLASS SEPARATION AND REMOVAL
4 Claims, 5 Drawing Figs.

[52] U.S. Cl. .................................................. 65/168,
    65/134, 65/342, 65/346, 65/347
[51] Int. Cl. ..................................................... C03b 5/20
[50] Field of Search ........................................... 65/133,
    134, 135, 165, 345, 346, 347, 339, 341, 342, 168

[56] References Cited
UNITED STATES PATENTS
1,751,045  3/1930  Mambourg ................... 65/345

*Primary Examiner*—S. Leon Bashore
*Assistant Examiner*—Saul R. Friedman
*Attorneys*—Clarence R. Patty, Jr. and Charles W. Gregg ABSTRACT: Apparatus for separating surface glass from a parent body of molten glass flowing through a forehearth and, thereafter, removing such surface glass from the forehearth. A stationary skimmer is positioned in the forehearth to interfere with or divert the flow of the surface glass and thereby separate such glass from the remainder of the parent body thereof. The skimmer has an upper portion having a horizontal planar configuration of a truncated triangle with the truncated face being on the upstream face of the upper portion. The upper surface of the upper portion is above the surface level of the glass. A lower ledge portion located below the surface level of the glass, projects upstream from the truncated face. The flow of the separated surface glass then being directed through one or more suitable channels or passages which extend from a region adjacent the upstream face of the upper portion of the skimmer and along a side of the upper portion to the exterior of the forehearth to effect removal of such glass therefrom.

PATENTED DEC 28 1971 3,630,708

INVENTORS.
Allen C. Ihrig
Villem Rahe
BY Charles W. Gregg
AGENT

FOREHEARTH SURFACE-GLASS SEPARATION AND REMOVAL

BACKGROUND OF THE INVENTION

Certain ingredients of many molten glass-making compositions or portions of such ingredients are volatile and, therefore, are often volitized or vaporized at temperatures to which such molten glass compositions are subjected during their flow through a forehearth. Loss of said volatile ingredients, or portions thereof, from the surface glass of a molten glass body leaves such surface glass rich, for an example, in silica and, therefore, not of the same final composition as the base glass or the glass below the surface glass, that is, the glass flowing below the surface glass in the forehearth. Such surface glass creates various forming and cooling problems, as well as visual appearance problems, due to its characteristics differing from those of said base glass or the glass below the surface glass. Previous means for and methods of separating so-called "off-composition" surface glass from the remainder of a body or bath of molten glass, that is, the base glass, have not been very successful in many instances and, therefore, the herein disclosed invention was developed to provide, in a forehearth, a more satisfactory means for and method of separation and removal of surface glass under conditions such as those outlined above.

SUMMARY OF THE INVENTION

In practicing the invention disclosed, a stationary skimmer is positioned in a forehearth to interfere with or divert the flow of the surface glass of a parent glass body or bath of molten glass flowing through the forehearth and separate said surface glass from the remainder of said parent body of glass. The skimmer embodies one or more troughs or passages leading to the exterior of the forehearth and through which the separated surface glass flows for removal thereof from the forehearth and to cullet if desired.

BRIEF DESCRIPTION OF THE DRAWINGS

Referring to the drawings.

Similar reference characters refer to similar parts in each of the FIGS. of the drawings.

PREFERRED EMBODIMENTS OF THE INVENTION

Figure 1:
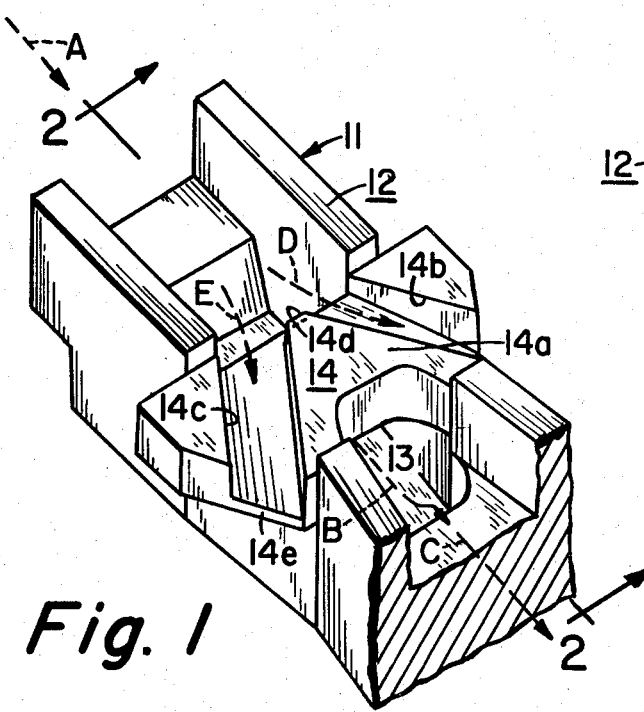
FIG. 1 comprises an isometric view of a section of a molten glass forehearth provided with a first embodiment of the invention.
Figure 2:
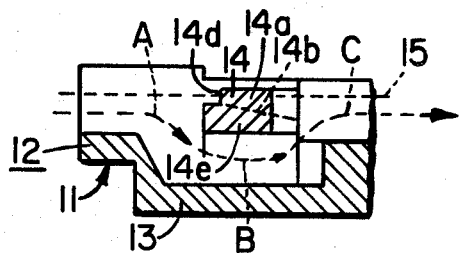
FIG. 2 is a cross-sectional view on a reduced scale of a section of the forehearth of FIG. 1 taken generally along line 2—2 of FIG. 1.

Referring to the drawings in detail, there is shown in FIGS. 1 and 2 a section of a molten glass forehearth 11 comprising a main body member 12 through which a body or bath of molten glass flows in a path from a glass entrance end through an intermediate bowl or throat portion 13 towards and out of a glass exit end of the forehearth as indicated by the dotted-line arrows designated A, B and C in FIGS. 1 and 2. A stationary skimmer 14 is provided above-said bowl portion 13 and extends across said path of flow of said bath or body of molten glass so as to interfere with or divert the flow of the surface glass of such body and separate such surface glass from the remainder of the molten glass body. For purposes of clarification of FIGS. 1 and 2 of the drawings the flowing molten glass body per se is not shown therein but the top surface of such a body is indicated in FIG. 2 by the dotted line designated 15. Furthermore, the top wall or cover of the forehearth is omitted from the drawings for purposes of simplification thereof.

Skimmer 14 includes an upper portion 14a (FIG. 1) having a horizontal planar configuration of a truncated triangle and whose upper surface is located above said dotted line 15 indicating the upper surface of a flowing molten glass body. The truncation 14d of upper portion 14a of skimmer 14 forms an upstream face for such upper portion as illustrated in FIGS. 1 and 2. Said configuration is preferably, but not necessarily, that of a truncated acute-angled triangle as illustrated in FIG. 1. Skimmer 14 also includes a lower ledge portion 14e which projects upstream from the upstream face or truncation 14d of upper portion 14a of skimmer 14 with the upper surface of such lower portion 14e of skimmer 14 being just below said surface glass for flow of such glass thereover, as hereinafter further discussed. Skimmer 14 further embodies a first passage or trough 14b extending along one side of the upper portion 14a of the skimmer to the exterior of forehearth 11. As illustrated by the dotted line in FIG. 2, the upstream open end of trough or passage 14b is preferably located in skimmer 14 so that the bottom surface of such end is substantially even with the upper surface of lower ledge portion 14a of skimmer 14 and, therefore, below the surface glass which it is desired to separate from the remainder of said body of molten glass. Trough or passage 14b slopes or extends downwardly from said upstream open end thereof and from a region adjacent truncation 14d of upper portion 14a of skimmer to the downstream end of such trough or passage such downstream end opening to the exterior of forehearth 11 for flow of separated surface glass to such exterior and, thereby, removal of such glass from the forehearth. Skimmer 14 is also illustrated as embodying a second passage or trough 14c (FIG. 1) which extends along a second side of the skimmer to the exterior of forehearth 11. Passage or trough 14c is similar to passage or trough 14b just described and, therefore, no detailed description of passage or trough 14c is considered necessary since its arrangement will be readily apparent to those skilled in the art from a brief glance at FIG. 1 of the drawings taken in conjunction with the description of passage 14b.

Figure 4:
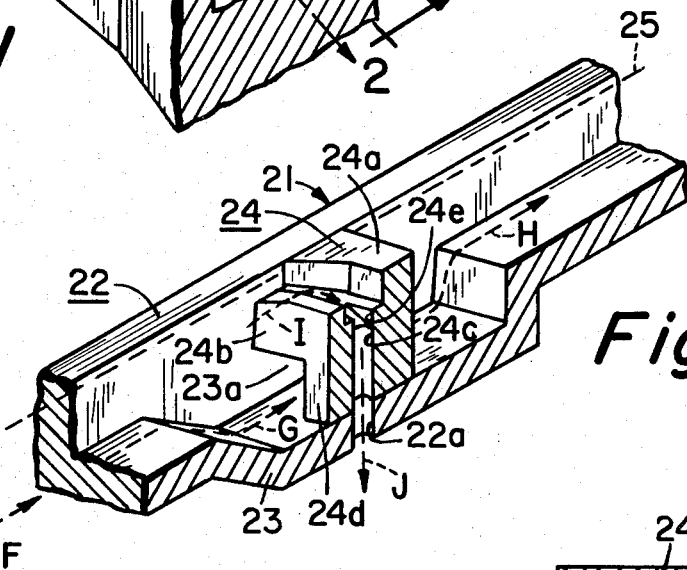
FIG. 4 is an isometric cross-sectional view of the forehearth section of FIG. 3 taken generally along line 4—4 of FIG. 3.
Figure 3:
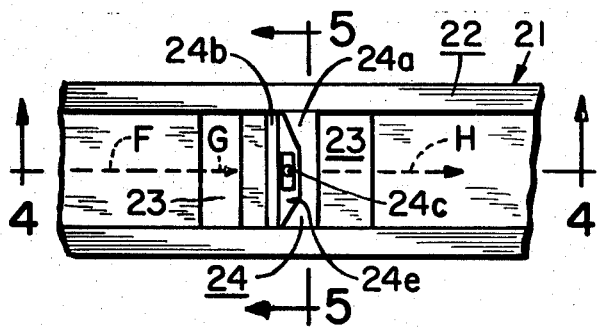
FIG. 3 comprises a top plan view of a section of a molten glass forehearth provided with a second embodiment of the invention.
Figure 5:
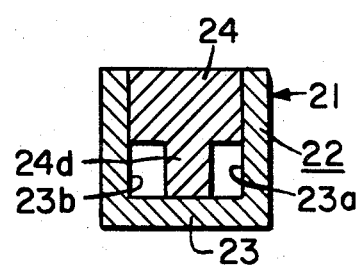
FIG. 5 comprises a cross-sectional view of the forehearth section of FIG. 3 taken generally along line 5—5 of FIG. 3.

Referring now to FIGS. 3, 4 and 5 of the drawings in detail, there is shown a section of a molten glass forehearth 21 comprising a main body member 22 through which a molten glass bath or body flows in a path from a glass entrance end through an intermediate bowl or throat portion 23 towards and out of a glass exit end of the forehearth as indicated by the dotted-line arrows designated F, G and H in FIGS. 3 and 4. A stationary skimmer 24 is provided in bowl portion 23 and extends across said path of flow of said body of molten glass so as to interfere with or divert the flow of the surface glass of such body and separate such surface glass from the remainder of the molten glass body. For purposes of clarification of FIGS. 3 and 4 of the drawings the flowing molten glass body per se is also not shown therein but the surface of such a body is indicated in FIG. 4 by the dotted line designated 25. Furthermore, as with forehearth 11 in FIGS. 1 and 2, the top wall of cover of forehearth 21 is omitted from the drawings for purposes of simplification thereof.

Skimmer 24 includes an upper portion 24a whose upper surface is located above said dotted line 25 indicating the upper surface of a flowing molten glass body as illustrated in FIG. 4. Skimmer 24 further includes a lower ledge portion 24b which projects upstream from the upstream face of said upper portion 24a of skimmer 24 with the upper surface of such lower portion 24b of skimmer 24 being just below said surface glass for flow of such glass thereover, as hereinafter further discussed.

Skimmer 24 further includes a pedestal or support portion 24d whose lower surface rests on the top surface of bowl portion 23 of body member 22 and which embodies a passage 24c shown in FIG. 4 as extending vertically downward through said pedestal or support portion 24d but which can, if found desirable, slope to a selected degree downwardly through such pedestal or support portion. The upper end of passage 24c opens into a generally longitudinal basin or well 24e located in a region adjacent said upstream face of upper portion 24a of skimmer 24, such well or basin sloping downwardly from the sides of said body member 22 toward said upper end of passage 24c. The lower end of passage 24c connects with the upper end of a similar passage 22a provided in the bottom wall of bowl portion 23 of body member 22, and the lower end of such passage 22a opens out through said bottom wall to the exterior of body member 22 and, therefore, to the exterior of forehearth 21 for flow of separated surface glass to such exterior and, thereby, removal of such glass from the forehearth.

As best illustrated in FIG. 5, pedestal or support portion 24d of skimmer 24 is substantially smaller in width than portions 24a and 24b of skimmer 24 to thereby provide channels such as 23a and 23b extending beneath skimmer 24 in bowl portion 23 of member 22 to permit the flow of the previously mentioned remainder of a flowing molten glass body through the intermediate bowl portion 23 of member 22, that is, to permit such flow of the part of the parent flowing molten glass body which is not skimmed or separated from the surface of such parent body by skimmer 24.

In the embodiment of the invention illustrated in FIGS. 1 and 2, the surface glass of a parent molten glass bath or body flowing through a forehearth such as 11 and separated from the remainder of such glass body by skimmer 14, flows over the upper surface of the upstream projecting part of ledge portion 14e of skimmer 14 and through troughs or passages 14b and 14c to the exterior of forehearth 11 as indicated by the dotted-line arrows D and E in FIG. 1 while the main portion or remainder of said glass body flows through bowl portion 13 of body member 12 of forehearth 11 and out of such bowl portion towards the exit end of such forehearth. The separated surface glass flowing over said ledge portion 14e is prevented, by such ledge portion, from sinking into the remainder of said parent glass body from which it separated and the separated surface glass which flows to the exterior of forehearth 11 through passages 14b and 14c may be collected and used as cullet if desired. Similarly, in the embodiment of the invention illustrated in FIGS. 3, 4 and 5 of the drawings, the surface glass of a parent molten glass bath or body flowing through a forehearth such as 21 and separated from the remainder of such glass body by skimmer 24, flows over the upper surface 24b of skimmer 24 and thence into well or basin 24e and down through passages 24c and 22a to the exterior of forehearth 21 as indicated by the dotted-line arrows I and J in FIG. 4, while the main portion or remainder of said glass body flows through passages 23a and 23b in bowl portion 23 of body member 22 of forehearth 21 and out of such bowl portion towards the exit end of such forehearth. The separated surface glass flowing over said ledge portion 24b is prevented, by such ledge portion, from sinking into the remainder of said parent glass body from which it is separated and the separated surface glass which flows to the exterior of forehearth 21 through passages 24c and 24a may also be collected and used as cullet if desired. The operation of the two embodiments of the invention shown and described will be readily apparent to those skilled in the art by a brief viewing of the drawings of the application.

What is claimed is:

1. In a forehearth in which a parent body of molten glass flows in a path from a glass entrance end of the forehearth towards a glass exit end thereof, apparatus for separating the surface glass of said body from the remainder thereof and removing such surface glass from the forehearth, such apparatus comprising;
    A. a stationary skimmer extending across said path of flow of said body of molten glass, such skimmer including;
        I. an upper portion having a horizontal planar configuration of a truncated triangle and an upper surface located above the upper surface of said parent body of glass, the truncation of said upper portion forming the upstream face of such upper portion of said skimmer;
        II. a lower ledge portion projecting upstream beyond said upstream face of said upper portion of said skimmer, the upper surface of such lower ledge portion being located below said surface glass for flow of such surface glass thereover and for thereby diverting the flow of and separating the surface glass from said remainder of said parent body of glass while preventing the sinking and remixing of the separated surface glass with the remainder of the parent body of glass; and
    B. a downwardly extending passage embodied in said skimmer and extending from a region adjacent said upstream face of said upper portion of the skimmer and along a side of such upper portion to the exterior of said forehearth for flow of said separated surface glass to such exterior.

2. Apparatus in accordance with claim 1 and in which said forehearth also embodies a bowl portion below said skimmer for said flow of said remainder of the flowing molten glass body past such skimmer.

3. Apparatus in accordance with claim 1 and in which said configuration of said upper portion of said skimmer is that of a truncated acute-angled triangle.

4. Apparatus in accordance with claim 3 and in which said forehearth also embodies a bowl portion below said skimmer for said flow of said remainder of the flowing molten glass body past such skimmer.

* * * * *